United States Patent
Tian et al.

(10) Patent No.: US 10,487,266 B1
(45) Date of Patent: Nov. 26, 2019

(54) POLYGENERATION METHOD OF BIOMASS DOWNFLOW CIRCULATION BED MILLISECOND PYROLYSIS LIQUEFACTION-GASIFICATION COUPLING

(71) Applicant: China University of Petroleum (East China), Qingdao (CN)

(72) Inventors: Yuanyu Tian, Qingdao (CN); Yingyun Qiao, Qingdao (CN); Kechang Xie, Qingdao (CN); Youqing Wu, Shanghai (CN); Huawei Zhang, Qingdao (CN); Zhaohe Yang, Qingdao (CN); Peijie Zong, Qingdao (CN); Fanfan Xu, Qingdao (CN)

(73) Assignee: China University of Petroleum (East China), Qingdao (CN)

(*) Notice: Subject to any disclaimer, the term of this patent is extended or adjusted under 35 U.S.C. 154(b) by 0 days.

(21) Appl. No.: 16/293,222

(22) Filed: Mar. 5, 2019

(30) Foreign Application Priority Data

Dec. 10, 2018 (CN) .......................... 2018 1 1501226

(51) Int. Cl.
*C10B 53/07* (2006.01)
*C10J 3/56* (2006.01)

(52) U.S. Cl.
CPC ................ *C10B 53/07* (2013.01); *C10J 3/56* (2013.01); *C10J 2300/0956* (2013.01); *C10J 2300/0976* (2013.01); *C10J 2300/1625* (2013.01); *C10J 2300/1696* (2013.01); *C10J 2300/1861* (2013.01)

(58) Field of Classification Search
CPC ..... C10B 53/07; C10J 3/56; C10J 2300/0956; C10J 2300/0976; C10J 2300/1625; C10J 2300/1696; C10J 2300/1861
See application file for complete search history.

(56) References Cited

U.S. PATENT DOCUMENTS

| | | | | |
|---|---|---|---|---|
| 4,211,606 A * | 7/1980 | Ponomarev | ............. | C10B 49/20 201/12 |
| 5,651,321 A * | 7/1997 | Siniakevith | ............. | F23G 5/027 110/341 |
| 8,105,482 B1 * | 1/2012 | Freel | ....................... | C10B 55/04 208/411 |
| 8,128,716 B2 * | 3/2012 | Krumm | ................... | C01B 3/501 423/644 |
| 8,277,736 B2 * | 10/2012 | Proll | ...................... | B01J 8/1818 422/129 |
| 8,961,743 B2 * | 2/2015 | Freel | ....................... | C10B 49/22 202/99 |
| 9,188,331 B2 * | 11/2015 | Jiang | ......................... | C01B 3/50 |
| 9,261,274 B2 * | 2/2016 | Jiang | ......................... | C01B 3/50 |
| 9,464,245 B2 * | 10/2016 | Gao | ......................... | C10B 49/10 |
| 9,809,770 B2 * | 11/2017 | Xu | ......................... | C10K 3/023 |
| 2010/0162625 A1 * | 7/2010 | Mills | ........................ | C10L 1/02 48/76 |
| 2013/0161563 A1 * | 6/2013 | Jiang | ........................ | C01B 3/50 252/373 |

FOREIGN PATENT DOCUMENTS

CN          101481619 A      7/2009

\* cited by examiner

*Primary Examiner* — Jonathan Miller
(74) *Attorney, Agent, or Firm* — Volpe and Koenig, P.C.

(57) ABSTRACT

A polygeneration method of biomass downflow circulation bed millisecond pyrolysis liquefaction-gasification coupling is provided.

8 Claims, 1 Drawing Sheet

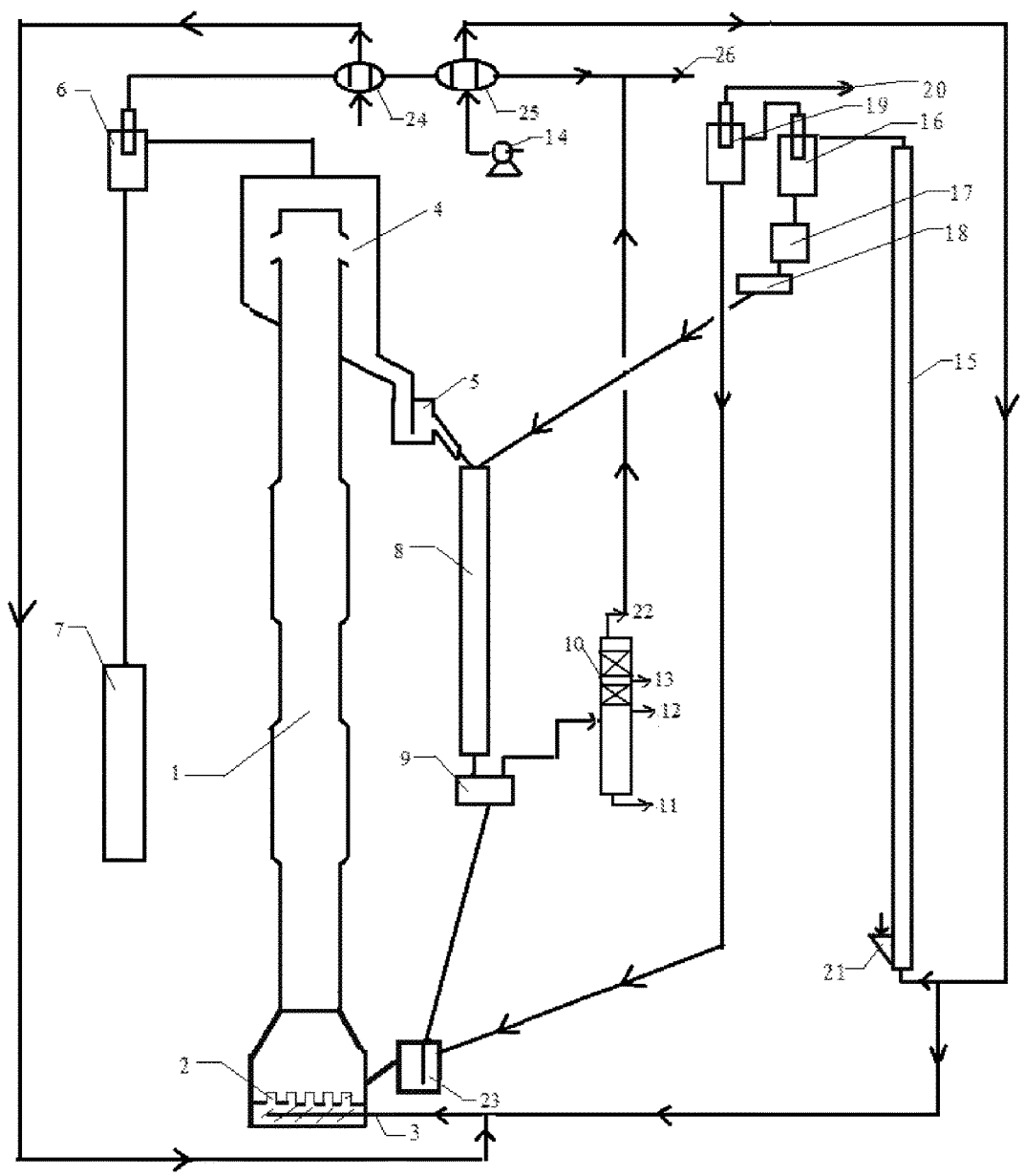

POLYGENERATION METHOD OF BIOMASS DOWNFLOW CIRCULATION BED MILLISECOND PYROLYSIS LIQUEFACTION-GASIFICATION COUPLING

This application claims priority to Chinese Application No. 201811501226.4, filed on Dec. 10, 2018, entitled "Biomass downflow bed millisecond pyrolysis liquefaction-gasification coupling polygeneration process", which is specifically and entirely incorporated by reference.

FIELD OF THE INVENTION

The present invention relates to the technical field of biomass energy, particularly relates to a polygeneration method of biomass downflow circulation bed millisecond pyrolysis liquefaction-gasification coupling.

BACKGROUND OF THE INVENTION

The agricultural and forestry wastes in China are more than 880 million tons at present. Due to the lack of effective utilization technology, the agricultural and forestry wastes have to be incinerated or abandoned. Such a practice not only wastes resources, but also causes a large number of socio-economic and ecological problems such as haze weather, air pollution, soil mineralization, fire disasters and traffic accidents; it has become the focus and difficult problem attracting public concern. The existing approaches of comprehensively utilizing biomass are quite extensive, and many approaches have high resource utilization rate and economic benefits, such as papermaking, direct-fired power generation, fiber ethanol and biogas; however, because of the small utilization scale and consumption amount, low efficiency, pollution or specific geographical requirements, any one approach cannot fundamentally meet the requirements of clean utilization of biomass with high quality and added-value. The rapid pyrolysis refining technology has emerged in the past three decades, the technology is used for converting biomass into liquid which has large energy density and can be easily stored and transported, the liquid may be processed to produce alternative fuels for vehicles, liquid fuels and chemical raw materials, it is the most promising and environmentally-friendly substitute for petroleum. The technology does not subject to restrictions of production scale and consumption territory, it can meet the requirements of large scale, high efficiency, high added-value, and being clean and pollution-free, it has been generally recognized as "the biomass energy technology with the greatest industrial development potential in the century". It is not only the focus and hotspot of biomass energy research & development in the international community, but also the frontier exploration project in the new energy field of the strategically emerging industry in China.

The internationally representative processes are mainly consisting of the rotary cone reaction process of Twente University in the Netherlands, the carrying bed reaction process of the Georgia Institute of Technology in the United States of America (USA), the bubbling and circulating fluidized bed process of the Ensyn Engineer Association of the Canada, the vortex reaction process developed by the National Renewable Energy Laboratory (NREL) of the USA, the multi-layer vacuum pyrolysis grind reaction process of the Laval University in the Canada. Similar technologies have been developed in sequence by a variety of domestic institutions in China. However, due to the defects and deficiencies existed in the processing technology, only the rotary cone process and the bubbling and circulating fluidized bed process have achieved 10,000-ton level industrial production at present. In the above processes, only the circulating fluidized bed rapid pyrolysis process can utilize the heat generated by partial semi-coke circulating combustion generated by pyrolysis to meet the heat demand of the reaction, it has the advantages such as the energy utilization is reasonable, the liquid yield is high, the equipment is simple and it can be easily upsized and expanded to a large scale, it is the top research project of the biomass energy field at home and abroad, and it is considered as the biomass rapid pyrolysis process which is most likely to achieve industrialized production. However, the circulating fluidized bed pyrolysis generally requires fluidizing gas, the cooling load is heavy, and it is difficult to remove fine powder generated by fluidized wear from the oil. The downflow circulating fluidized bed has the advantages such as it is provided with the parallel flow and descending movement along the gravity field, the solid-solid or gas-solid contact time is short, the reaction is fast with uniform radial distribution and small back-mixing, and the solid/gas or solid/solid ratio may be flexibly adjusted. It maintains the advantages of high liquid yield and large-scale production of fluidized bed pyrolysis, and it does not need for fluidized wind, the residence time of pyrolysis gas is short, the particle wear and fine powder is less, thereby lowering the cooling load and energy consumption, and the removal of ash from oil is relatively easy, thus the downflow circulating fluidized bed will be the optimum reactor for rapid pyrolysis of biomass which shall be urgently developed and applied. However, given that the biomass raw material contains potassium and a high water content, and there is a significant density difference between the biomass raw material and the pyrolysis semi-coke and carrier, the current typical rapid pyrolysis process in the world generally confront with eleven difficult problems affecting the industrial upsizing and stable operation in long period of the biomass pyrolysis technology, namely caloric transfer and reaction control, the oil carried with ash, high water content in oil, low liquid yield, oil and gas coking and blockage, semi-coke carrier density return, self-polymerization in the process of heating biological oil, the dilution of dry gas by fluidized gas and energy consumption, the melting of potassium-containing carrier causes the bed material to coke and deactivate the bed, the drying of biomass raw materials, abrasion of mechanical moving parts of reactors under high temperature, safe discharge of semi-coke and clean utilization.

CN101481619A discloses a self-mixing downflow fluidized bed rapid pyrolysis process for solid organics, wherein the mixing descending reactor and the fluidized bed re-activator are coupled to form a reaction-regeneration coupling system of the solid heat carrier circulation, which performs control on the caloric transfer and reaction. Despite the difficult problem of oil carried with ash caused by the hot ash is eliminated from the source by fractionation of heat carrier, pyrolyzing heat carrier with the large and medium particles with the downflow pyrolysis reactor, the discharge of hot ash with fine particles; however, the biomass powder is not fractionated after the drying process, the fine particles therein will further cause the phenomenon of oil carried with ash from the source. The oil and gas are not directly fractionated, and the problem of high water content in oil has not been effectively solved. In addition, the industrialized promotion of the self-mixing downflow fluidized bed rapid pyrolysis process for biomass has been plagued by the difficult problems such as oil and gas coking and blocking, semi-coke carrier density return, self-polymerization in the process of heating biological oil, semi-coke volatiles unregulated, semi-coke powder efflux easy to catch fire, semi-coke not be cleaned and utilized, and drying of the biomass raw materials.

SUMMARY OF THE INVENTION

A purpose of the present invention is to overcome the disadvantages of the existing biomass pyrolysis liquefaction technology, such as oil and gas coking and blocking, semi-coke carrier density return, self-polymerization in the process of heating biological oil, drying of the biomass raw materials, and safety and utilization problem with respect to discharge of pyrolysis semi-coke. The present invention provides a polygeneration method of biomass downflow circulation bed millisecond pyrolysis liquefaction-gasification coupling. The method may be used for completely solving the common engineering challenges, namely caloric transfer and reaction control during the biomass pyrolysis and liquidation, the oil carried with ash, high water content in oil, low liquid yield, oil and gas coking and blockage, semi-coke carrier density return, self-polymerization in the process of heating biological oil, the dilution of dry gas by fluidized gas and energy consumption, the melting of potassium-containing carrier causes the bed material to coke and deactivate the bed, the drying of biomass raw materials, abrasion of mechanical moving parts of reactors under high temperature, semi-coke volatile component control and clean utilization, thereby avoiding the secondary pollution caused by discharge of the semi-coke and the safety hazard of fire disaster, maximizing production of the liquid products, producing the fuel gas with high calorific value for power generation, simplifying the process and reducing the investment.

For the sake of fulfilling the invention purpose, the present invention provides a polygeneration method of biomass downflow circulation bed millisecond pyrolysis liquefaction-gasification coupling comprising the following steps:

S1, drying and lifting the biomass powder having an equivalent diameter of not more than 10 mm by a hot air lift pipe, and fractionating the dried biomass powder at the top of the hot air lift pipe to obtain air, fine particle biomass and biomass having large and medium particles;

S2, directly venting the air to the outside;

introducing the fine particle biomass into a gasification lift pipe through a semi-coke return valve; and passing the biomass having large and medium particles through a rotary feeder, and performing the rapid mixing, temperature rise and pyrolysis in milliseconds at a top of a downflow pyrolysis reactor with a high-temperature circulating heat carrier falling through a high-temperature carrier return valve, in order to obtain pyrolysis oil and gas, semi-coke and heat carrier;

S3, performing rapid separation of the pyrolysis oil and gas, semi-coke and heat carrier at a lower part of a riser of the downflow pyrolysis reactor by means of an oil and gas gas-solid separator; fractionating the separated pyrolysis oil and gas through a fractionation tower to obtain a variety of distillate petroleum products and pyrolysis dry gas; performing gasification reaction of the separated heat carrier and semi-coke with the fine particle biomass, water vapor and hot air in the gasification lift pipe and heating the heat carrier;

S4, at the top of the gasification lift pipe, separating the high temperature carrier and the synthesis gas obtained by the gasification reaction and heating with the two-stage gas-solid separators, mixing the separated synthesis gas which is subjected to the heat exchange with water and heat exchange with air, with the pyrolysis dry gas from the step S3 and discharging the mixture as fuel gas for power generation; transferring the separated heat carrier into a top of the downflow pyrolysis reactor and to be applied as a high temperature circulating heat carrier; transferring the separated fine ash into the fine ash cooling silo and to be discharged as a silicon-potash fertilizer;

S5, heating the air discharged by a booster fan by an air heat-exchanger, introducing a part of the obtained hot air into the step S1 and to be pumped to a bottom of the hot air lift pipe for lifting and drying the biomass powder, introducing another part of the hot air into the step S3 and to be pumped into the gasification lift pipe.

According to the present invention, preferably, in step S1, the gas flow rate in the hot air lift pipe is 2-18 m/s, and the outlet temperature of the hot air lift pipe is no more than 120° C., more preferably the outlet temperature is 100-120° C.

According to the present invention, preferably, in step S2, the weight ratio of the high temperature circulating heat carrier to the biomass having large and medium particle is 2-8:1.

According to the present invention, preferably, in step S2, the outlet reaction temperature of the downflow pyrolysis reactor is within a range of 450° C.-600° C., and the residence time of the biomass having large and medium particles and the high temperature circulating heat carrier in the downflow pyrolysis reactor is 0.2-3 s.

According to the present invention, preferably, in step S3, the reaction temperature of the gasification lift pipe ranges from 750° C. to 1,000° C., and the gas flow rate in the gasification lift pipe is 2-18 m/s.

According to the present invention, preferably, in step S4, the temperature of the synthesis gas after the water heat exchanger and air heat exchanger is no more than 45° C., more preferably the temperature is 35-45° C.

According to the present invention, preferably, in step S5, the temperature of the hot air is no more than 450° C., more preferably the temperature is 350-450° C.

According to the present invention, preferably, the water vapor is obtained by exchanging heat between water and the synthesis gas, and the temperature of water vapor is no less than 150° C., more preferably the temperature is 150-180° C.; in the gasification lift pipe, the water vapor is mixed with hot air and the mixture is applied as a gasifying agent.

In the present invention, the equivalent diameter means an equal volume spherical diameter of the non-spherical particle, which can be measured by a sedimentation method. The fine particle biomass refers to biomass particle having a particle equivalent diameter no more than 0.02 mm; the biomass having large and medium particles refers to biomass particle having a particle equivalent diameter no more than 10 mm.

The above method provided by the present invention can be carried out in the system including the biomass downflow circulating bed shown in FIG. 1. The flow process is also illustrated in FIG. 1, and the specific implementation process is as follows:

S1, introducing the biomass powder having an equivalent diameter of no more than 10 mm into the hot air lift pipe 15 from the biomass powder inlet 21 and drying and lifting the biomass powder by the hot air life pipe, and the dried biomass powder passes through a two-stage gas-solid separators (including an air primary gas-solid separator 16 and an air secondary gas-solid separator 19) at a top of the hot air lift pipe 15 for fractionation, so as to obtain air, fine particle biomass and biomass having large and medium particles;

S2, directly venting the air to the outside from an air outlet 20;

introducing the fine particle biomass into a gasification lift pipe 1 through a semi-coke return valve 23; and passing the biomass having large and medium particle through an upper silo 17 and a rotary feeder 18, and performing the rapid mixing, temperature rise and pyrolysis in milliseconds at a top of a downflow pyrolysis reactor 8 with a high-temperature circulating heat carrier falling through a high-temperature carrier return valve 5, in order to obtain pyrolysis oil and gas, semi-coke and heat carrier;

S3, performing rapid separation of the pyrolysis oil and gas, semi-coke and heat carrier at a lower part of a riser of the downflow pyrolysis reactor 8 by means of an oil and gas gas-solid separator 9; fractionating the separated pyrolysis oil and gas through a fractionation tower 10 to obtain a variety of distillate petroleum products and pyrolysis dry gas; the separated heat carrier and semi-coke together with the fine particle biomass pass through the semi-coke return valve 23 and then mix with water vapor and hot air at a bottom of the gasification lift pipe 1, the mixture (including the separated heat carrier and semi-coke, the fine particle biomass, water vapor and hot air) enters into the gasification lift pipe 1 for performing gasification reaction and the heat carrier is heated;

S4. at the top of the gasification lift pipe 1, separating the high temperature carrier and the synthesis gas obtained by the gasification reaction and heating with the two-stage gas-solid separators (including an inertial gas-solid separator 4 and a secondary gas-solid separator 6); mixing the separated synthesis gas after passing a water heat exchanger 24 and an air heat exchanger 25 for exchanging heat with water and air sequentially, with the pyrolysis dry gas from the step S3 and discharging the mixture from a fuel gas outlet 26 as fuel gas for power generation; transferring the separated heat carrier into a top of the downflow pyrolysis reactor 8 and to be applied as a high temperature circulating heat carrier; transferring the separated fine ash into a fine ash cooling silo 7 and to be discharged as a silicon-potash fertilizer;

S5, heating the air discharged from a booster fan 14 by an air heat-exchanger 25, a part of the obtained hot air is introduced into the step S1 and pumped to a bottom of the hot air lift pipe 15 for lifting and drying the biomass powder, another part of the hot air is introduced into the step S3 and pumped into the gasification lift pipe 1.

The hot air is mixed at the bottom of the gasification lift pipe 1 with water vapor from the water heat exchanger 24, the mixture is applied as a gasifying agent, and is introduced into the gasification lift pipe 1 through an intake pipe 3 to perform a gasification reaction with the semi-coke and heat the heat carrier.

A gas distributor 2 is also provided at a bottom of the gasification lift pipe 1.

By means of fractional distillation conducted by the oil and gas fractionation tower 10, a heavy oil distillate is received at a heavy oil outlet 11, a light oil distillate is obtained at a light oil outlet 12, a wood vinegar product is prepared at a wood vinegar outlet 13, and the pyrolysis dry gas is discharged from the dry gas outlet 22.

In the present invention, the biomass may be at least one of pine powder, poplar wood powder, corn stover and cotton straw.

By means of the above-mentioned technical solution, the method provided by the present invention can be used for performing fractionation on both the biomass powder and the heat carrier, pyrolyzing the large and medium particle carrier and the biomass by the downflow pyrolysis reactor, and directly sending the biomass fine powder to the gasification lift pipe for gasification and heating, directly discharging the fine particle carrier to the outside and applying it as the silicon-potash fertilizer, thereby eliminating the difficult problems from the source, namely the oil carried with ash, cleaning and utilization of the semi-coke, utilization of the biomass, and the melting of potassium-containing carrier causes the bed material to coke and deactivate the bed.

The features of the present invention will be described in detail with reference to the embodiment examples.

BRIEF DESCRIPTION OF THE DRAWINGS

FIG. 1 is a schematic diagram of polygeneration process of biomass downflow circulation bed millisecond pyrolysis liquefaction-gasification coupling provided by the present invention.

DESCRIPTION OF THE REFERENCE SIGNS

| | | |
|---|---|---|
| 1. gasification lift pipe | 2. gas distributor | 3. intake pipe |
| 4. inertial gas-solid separator | 5. high-temperature carrier return valve | 6. secondary gas-solid separator |
| 7. fine ash cooling silo | 8. downflow pyrolysis reactor | 9. oil and gas gas-solid separator |
| 10. oil and gas fractionation tower | 11. heavy oil outlet | 12. light oil outlet |
| 13. wood vinegar outlet | 14. booster fan | 15. hot air lift pipe |
| 16. air primary gas-solid separator | 17. upper silo | 18. rotary feeder |
| 19. air secondary gas-solid separator | 20. air outlet | 21. biomass powder inlet |
| 22. dry gas outlet | 23. semi-coke return valve | 24. water heat-exchanger |
| 25. air heat-exchanger | 26. fuel gas outlet | |

DETAILED DESCRIPTION OF THE EMBODIMENTS

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to yield one or more new numerical ranges, which should be considered as specifically disclosed herein.

Example 1

The biomass powder having an equivalent diameter of no more than 10 mm and a transmission rate of 25 t/h is introduced into the hot air lift pipe 15 from the biomass powder inlet 21 for drying and lifting, and the dried biomass powder is fractionated by an air primary gas-solid separator 16 and an air secondary gas-solid separator 19, so as to obtain air, fine particle biomass and biomass having large and medium particle;

The air is directly vented to the outside from the air outlet 20, the fine particle biomass passed through a semi-coke return valve 23 and enters into a gasification lift pipe 1; the biomass having large and medium particle is performed with the rapid mixing, temperature rise and pyrolysis in milliseconds at a top of a downflow pyrolysis reactor 8 with a high-temperature circulating heat carrier falling through a high-temperature carrier return valve 5, in order to obtain pyrolysis oil and gas, semi-coke and heat carrier;

The pyrolysis oil and gas, semi-coke and heat carrier are performed with rapid separation at a lower part of a riser of the downflow pyrolysis reactor 8 by means of an oil and gas gas-solid separator 9; the separated heat carrier and semi-coke pass through a semi-coke return valve 23 for air transmission and enter into the gasification lift pipe 1, and then mix with water from an intake pipe 3 and water vapor from a gas distributor 2 to perform gasification, combustion and heating; the separated pyrolysis oil and gas pass through an oil and gas fractionation tower 10 to obtain wood vinegar, light oil, heavy oil and pyrolysis dry gas; the high-temperature heat carrier and synthesis gas obtained by heating are separated by an inertial gas-solid separator 4 and a secondary gas-solid separator 6, the separated synthesis gas is subjected to two stages heat exchanges by a water heat-exchanger 24 and an air heat-exchanger 25, and is mixed with the pyrolysis dry gas 22, the mixture is applied as the fuel gas for power generation;

The heat carrier having large and medium particle separated by the inertial gas-solid separator 4 enters into a top of the downflow pyrolysis reactor 8 as a high-temperature circulating carrier, and the fine ash separated by the secondary gas-solid separator 6 of heat carrier enters into a fine ash cooling silo 7 and is discharged as a silicon-potash fertilizer;

The air discharged from a booster fan 14 is heated by an air heat-exchanger 25, a part of the obtained hot air is pumped to a bottom of the hot air lift pipe 15 for lifting and drying the biomass powder introduced from a biomass powder inlet 21, another part of the hot air is introduced into a bottom of the gasification lift pipe 1, and is mixed with water vapor obtained from the water heat exchanger 24, the mixture is applied as a gasifying agent, which performs a gasification reaction with the semi-coke and heats the heat carrier. The semi-coke is completely converted into gas, and the problems of the semi-coke volatiles unregulated, the semi-coke powder efflux easy to catch fire and the semi-coke not be cleaned and utilized can be avoided.

Wherein, the hot air lift pipe 15 has a gas flow rate of 6 m/s, and an outlet temperature of the lift pipe is 120° C.

The mixing ratio by weight of the high temperature heat carrier to the biomass powder is 8:1.

The outlet reaction temperature of the downflow pyrolysis reactor 8 is 520° C., and a residence time of the biomass and heat carrier is 0.6 s.

The reaction temperature in the gasification lift pipe 1 is 750° C., and the gas flow rate was 8 m/s.

The temperature of the synthesis gas is 45° C. after heat exchange with water and heat exchange with air.

The temperature of the hot air is 400° C.

The water vapor temperature obtained through the heat exchange by water is 150° C.

The biomass is pine powder. The liquid (light oil+heavy oil) yield of rapid pyrolysis is 68%, the ash content in oil (light oil+heavy oil) is less than 0.2 wt. %, the water content is lower than 1 wt. %; the yield of mixed gas (synthesis gas+pyrolysis dry gas) is 27%, the calorific value is about 2,100 kcal; and the yield of silicon-potash fertilizer is about 10%.

Example 2

The process is performed according to the method in Example 1, the differences reside in that the reaction temperature in the gasification lift pipe 1 is 1,000° C.; the mixing ratio by weight of the high temperature heat carrier to the biomass powder is 2:1; the outlet reaction temperature of the downflow pyrolysis reactor 8 is 450° C.; the temperature of the hot air is 450° C.

The biomass is poplar wood powder. The liquid (light oil+heavy oil) yield of rapid pyrolysis is 62%, the ash content in oil (light oil+heavy oil) is less than 0.2 wt. %, the water content is lower than 1 wt. %, the yield of mixed gas (synthesis gas+pyrolysis dry gas) is 33%, the calorific value is about 2,100 kcal, and the yield of silicon-potash fertilizer is about 10%.

Example 3

The process is performed according to the method in Example 1, the differences reside in that the reaction temperature in the gasification lift pipe 1 is 900° C.; the mixing ratio by weight of the high temperature heat carrier to the biomass powder is 8:1; the outlet reaction temperature of the downflow pyrolysis reactor 8 is 600° C.; the temperature of the hot air is 350° C.

The biomass is corn stover. The liquid (light oil+heavy oil) yield of rapid pyrolysis is 39%, the ash content in oil (light oil+heavy oil) is less than 0.2 wt. %, the water content is lower than 1 wt. %, the yield of mixed gas (synthesis gas+pyrolysis dry gas) is 56%, the calorific value is about 2,100 kcal, and the yield of silicon-potash fertilizer is about 10%.

Example 4

The process is performed according to the method in Example 1, the differences reside in that the reaction temperature in the gasification lift pipe 1 is 930° C.; the mixing ratio by weight of the high temperature heat carrier to the biomass powder is 6:1; the outlet reaction temperature of the downflow pyrolysis reactor 8 is 480° C.; the temperature of the hot air is 420° C.

The biomass is cotton straw. The liquid (light oil+heavy oil) yield of rapid pyrolysis is 55%, the ash content in oil (light oil+heavy oil) is less than 0.2 wt. %, the water content is lower than 1 wt. %, the yield of mixed gas (synthesis gas+pyrolysis dry gas) is 40%, the calorific value is about 2,100 kcal, and the yield of silicon-potash fertilizer is about 10%.

Comparative Example 1

The biomass powder having an equivalent diameter of not more than 10 mm and a transmission rate of 25 t/h is introduced into a flue gas lift pipe for drying and lifting, and the biomass powder is fractionated by a flue gas primary gas-solid separator and a flue gas secondary gas-solid separator, so as to obtain air, fine particle biomass and biomass having large and medium particle;

The air is directly vented to the outside, the fine particle biomass passed through a semi-coke return valve and enters into a combustion lift pipe; the biomass having large and medium particle is performed with the rapid mixing, temperature rise and pyrolysis in milliseconds at a top of a downflow pyrolysis reactor with a high-temperature circulating heat carrier falling through a high-temperature carrier return valve, in order to obtain pyrolysis oil and gas, semi-coke and heat carrier;

The pyrolysis oil and gas, semi-coke and heat carrier are performed with rapid separation at a lower part of a riser of the downflow pyrolysis reactor by means of an oil and gas gas-solid separator; the separated heat carrier and semi-coke passes through a semi-coke return valve for air transmission and enter into the combustion lift pipe to perform combustion and heating; the separated pyrolysis oil and gas pass through an oil and gas fractionation tower to prepare wood vinegar, light oil, heavy oil and pyrolysis dry gas;

The high-temperature heat carrier and synthesis gas obtained by heating are separated by an inertial gas-solid separator and a heat carrier secondary gas-solid separator, the separated flue gas is transmitted to a flue gas drying and lift pipe for elevating and drying the biomass powder;

The large and medium particle heat carrier separated by the inertial gas-solid separator enters into a top of the downflow pyrolysis reactor as a high-temperature circulating carrier, and the fine ash separated by the secondary gas-solid separator of heat carrier enters into a fine ash cooling silo and is discharged as a silicon-potash fertilizer;

Wherein, the reaction temperature in the combustion lift pipe 1 is 750° C., and the gas flow rate was 8 m/s.

The mixing ratio by weight of the high temperature heat carrier to the biomass powder is 8:1.

The outlet reaction temperature of the downflow pyrolysis reactor is 520° C., and a residence time of the biomass and heat carrier is 0.6 s.

The flue air lift pipe has a gas flow rate of 6 m/s, and an outlet temperature of the lift pipe is 120° C.

The biomass is pine powder. The liquid yield (light oil+heavy oil) of rapid pyrolysis is 60%, the ash content in oil (light oil+heavy oil) is less than 0.2 wt. %; the water content is lower than 1 wt. %; the calorific value of the pyrolysis gas is about 3,800 kcal, and the yield of silicon-potash fertilizer is about 7%, the semi-coke yield is 22%.

As can be seen from the above-mentioned examples and comparative examples that the polygeneration method of biomass downflow circulation bed millisecond pyrolysis liquefaction-gasification coupling provided by the invention can be used for processing a plurality of biomass, and improving the liquid yield, performing cooperative production of fertilizer, and gasifying the semi-coke for power generation, thereby solving the difficult problem of clean and efficient utilization of the semi-coke.

The above content describes in detail the preferred embodiments of the present invention, but the present invention is not limited thereto. A variety of simple modifications can be made to the technical solutions of the present invention within the scope of the technical concept of the present invention, including combining individual technical feature in any other suitable manner, such simple modifications and combinations should also be regarded as the content disclosed by the present invention, each of them falls into the protection scope of the present invention.

The invention claimed is:

1. A polygeneration method of biomass downflow circulation bed millisecond pyrolysis liquefaction-gasification coupling comprising:

S1, drying and lifting via hot air a biomass powder having an equivalent diameter of no more than 10 mm by a hot air lift pipe, and fractionating the dried biomass powder at the top of the hot air lift pipe to obtain air, fine particle biomass and biomass having large and medium particles;

S2, directly venting to the outside; introducing the fine particle biomass into a gasification lift pipe through a semi-coke return valve; and passing the biomass having large and medium particles through a rotary feeder, and performing rapid mixing, temperature rise and pyrolysis in milliseconds at a top of a downflow pyrolysis reactor with a high-temperature circulating heat carrier falling through a high-temperature carrier return valve, in order to obtain pyrolysis oil and gas, semi-coke and heat carrier;

S3, performing rapid separation of the pyrolysis oil and gas, semi-coke and heat carrier at a lower part of a riser of the downflow pyrolysis reactor by means of an oil and gas gas-solid separator; fractionating the separated pyrolysis oil and gas through a fractionation tower to obtain a variety of distillate petroleum products and pyrolysis dry gas; performing gasification reaction of the separated heat carrier and semi-coke with the fine particle biomass, water vapor and hot air in the gasification lift pipe and heating the heat carrier;

S4, at the top of the gasification lift pipe, separating the high temperature carrier and the synthesis gas obtained by the gasification reaction and heating with two-stage gas-solid separators, mixing the separated synthesis gas which is subjected to the heat exchange with water and heat exchange with air, with the pyrolysis dry gas from the step S3 and discharging the mixture as fuel gas for power generation; transferring the separated heat carrier into a top of the downflow pyrolysis reactor as a high temperature circulating heat carrier; transferring the separated fine ash into the fine ash cooling silo and to be discharged as a silicon-potash fertilizer;

S5, discharging air by a booster fan and heating the air discharged by the booster fan by an air heat-exchanger, introducing a part of the obtained hot air into the step S1 by pumping the part of the obtained hot air to a bottom of the hot air lift pipe to be the hot air lifting and drying the biomass powder, introducing another part of the obtained hot air into the step S3 and by pumping the another part of the obtained hot air into the gasification lift pipe.

2. The method according to claim 1, wherein in step S1, the gas flow rate in the hot air lift pipe is 2-18 m/s, and the outlet temperature of the hot air lift pipe is no more than 120° C.

3. The method according to claim 1, wherein in step S2, the weight ratio of the high temperature circulating heat carrier to the biomass having large and medium particles is 2-8:1.

4. The method according to claim 1, wherein in step S2, the outlet reaction temperature of the downflow pyrolysis reactor is within a range of 450° C.-600° C., and the residence time of the biomass having large and medium particles and the high temperature circulating heat carrier in the downflow pyrolysis reactor is 0.2-3 s.

5. The method according to claim 1, wherein in step S3, the reaction temperature of the gasification lift pipe ranges from 750° C. to 1,000° C., and the gas flow rate in the gasification lift pipe is 2-18 m/s.

6. The method according to claim 1, wherein in step S4, the temperature of the synthesis gas after the water heat exchanger and air heat exchanger is no more than 45° C.

7. The method according to claim 1, wherein in step S5, the temperature of the obtained hot air is no more than 450° C.

8. The method according to claim 1, wherein the water vapor is obtained by exchanging heat between water and the synthesis gas, and the temperature of water vapor is no less than 150° C.; in the gasification lift pipe, the water vapor is mixed with hot air and the mixture is applied as a gasifying agent.

* * * * *